Patented May 12, 1931

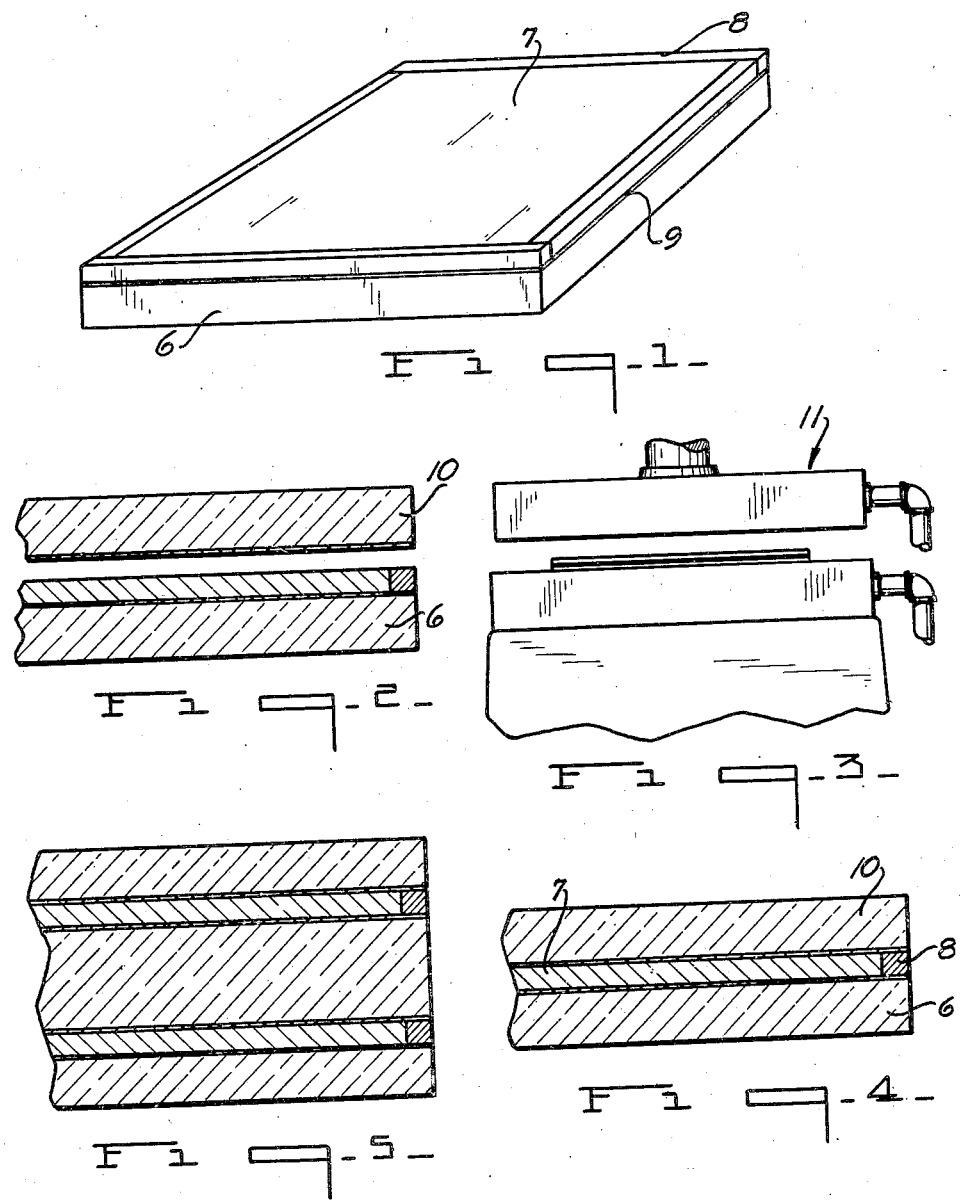

1,805,259

UNITED STATES PATENT OFFICE

JAMES W. H. RANDALL, OF NEW YORK, N. Y., ASSIGNOR TO LIBBEY-OWENS-FORD GLASS COMPANY, OF TOLEDO, OHIO, A CORPORATION OF OHIO

PROCESS OF PRODUCING LAMINATED GLASS

Application filed February 24, 1928. Serial No. 256,592.

The present invention relates to laminated glass and to the process of producing the same.

An important object of the invention is to provide as a new article of manufacture, a sheet of laminated glass, and a process of producing the same wherein a sheet of non-brittle material and strips of sealing material are interposed between two sheets of glass and the whole then united to form a composite structure.

Another object of the invention is to provide such an article and process of producing the same wherein a sheet of preferably cellulose composition material is arranged on a sheet of glass, the sheet of composition material being smaller than the sheet of glass, after which strips of preferably resin material are interposed between the edges of the cellulose sheet and the edges of the glass sheet, after which a second sheet of glass is arranged on top of the cellulose sheet and the resin strips, and then the whole united by any suitable adhesive or the like.

Other objects and advantages of the invention will become more apparent during the course of the following description when taken in connection with the accompanying drawings.

In the drawings wherein like numerals are employed to designate like parts throughout the same, Fig. 1 is a perspective view illustrating one sheet of glass and the inner membrane in position, Fig. 2 is a sectional view of the laminations in proper relation before they have been united, Fig. 3 is a diagrammatic representation of a means which may be used to obtain a bond between the laminations, and Figs. 4 and 5 are sectional views illustrating two forms of finished product.

Referring to Fig. 1, the numeral 6 designates a preferably transparent sheet of glass whose surfaces may be ground and polished, or not, as desired. The upper exposed surface of the glass sheet may be coated with any suitable adhesive. This invention does not pertain to the type of adhesive or bonding medium used between the laminations, and therefore any bonding means may be used in carrying out this invention.

After the adhesive or other material has been arranged on the glass surface, a sheet 7 of non-brittle material such as a cellulose composition material, is arranged centrally of the glass sheet. The size of the sheet 7 is slightly smaller than that of the sheet 6 so that sufficient room is left to place strips 8 all around the edge of the center sheet as shown in Fig. 1. It is preferred that the outer edges of the strips 8 be flush with the edges of the glass sheet 6. If a suitable resin is used for the strip material 8, it is not necessary that the adhesive 9 extend under the resin material. In fact, in some cases it may be preferable to remove the adhesive from these portions of the glass and allow the resin strips 8 to contact directly with the glass. This is because the heat and pressure used in the bonding operation will be sufficient to cause an adhesion between the glass and the resin as well as a bond between the cellulose sheet 7 and the glass. By doing away with the adhesive around the edges of the glass, the atmosphere will not have an injurious effect on the finished sheet.

After the central sheet 7 and strips 8 have been arranged as shown in Fig. 1, a second sheet of glass 10, shown in Fig. 2, is arranged over the same, and the sandwich thus formed may be placed in a press designated in its entirety by the numeral 11, and there subjected to the combined action of heat and pressure. Fig. 4 is a sectional view illustrating one form of finished product showing the strips 8 which form a seal for the bond between the non-brittle sheet 7 and the glass sheets 6 and 10.

By forming the seals in this manner, the possibility of bubbles, etc. being present in a seal produced by pouring, etc. is eliminated, and secondly, the strips 8 will tend to prevent slippage of the non-brittle sheet 7 during the pressing operation. If the sheet 7 were made smaller than the glass sheets and the resin strips or similar strips not used, there might be a tendency for the non-brittle sheet to slip and create an uneven channel around the laminated sheet for the reception of a sealing material.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated glass consisting in arranging a sheet of non-brittle material on a sheet of glass, mounting sealing material strips on said sheet of glass and around the non-brittle sheet and in the same plane therewith, then placing a second sheet of glass thereover and combining the whole into a composite structure.

2. The method of sealing laminated glass having two sheets of glass and an inter-sheet of non-brittle material strongly adherent to the glass on both sides, which consists in placing the intersheet on one of the sheets of glass with a margin at the edge, placing on such margin a previously formed, continuous strip of sealing material, superimposing the second sheet of glass on the first sheet, the intersheet and the sealing strip, and effecting adhesion of the sealing strip to the glass on both sides.

Signed at Toledo, in the county of Lucas and State of Ohio, this 17th day of February, 1928.

JAMES W. H. RANDALL.